Aug. 3, 1937.  T. GOSSELIN  2,088,698
COLLAR ADJUSTING DEVICE
Filed June 20, 1936
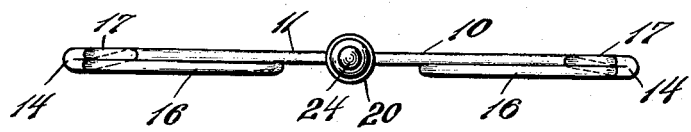
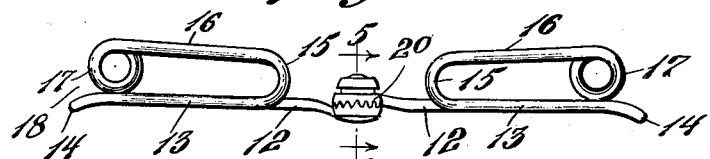
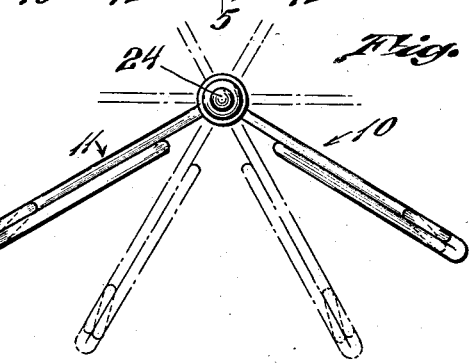
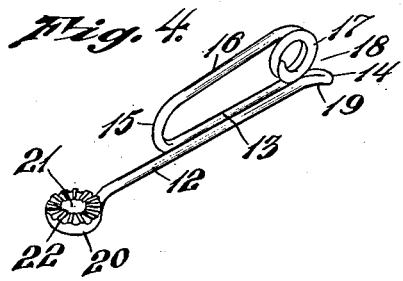
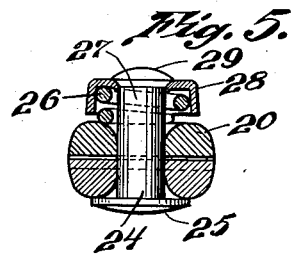
INVENTOR.
Thomas Gosselin
BY Barlow & Barlow
ATTORNEYS.

Patented Aug. 3, 1937

2,088,698

UNITED STATES PATENT OFFICE 2,088,698

COLLAR ADJUSTING DEVICE

Thomas Gosselin, Attleboro, Mass., assignor to Swank Products, Inc., a corporation of Delaware Application June 20, 1936, Serial No. 86,377

6 Claims. (Cl. 24—81)

This invention relates to a collar adjusting device; and has for one of its objects the provision of a device which may have its collar engaging ends spaced varying distances apart so as to cause the opening between the collar flaps to be spaced the desired distance.

Another object of the invention is the provision of means which will positively hold the collar engaging arm in different desired angular positions of adjustment to accomplish this various spacing.

Another object of the invention is the provision of an adjustment means which will positively hold the device in certain definite steps of adjustment for accomplishing the desired spacing.

Another object of the invention is the provision of resilient means such as a spring for urging the engaging parts into frictional contact, whereby the holding pressure may be predetermined by placing in the device springs of various tensions.

Another object of the invention is a very flexible adjustment and yet one which will positively stay in set position after the adjustment has been made.

With these and other objects in view, the invention consists of certain novel features of construction, as will be more fully described, and particularly pointed out in the appended claims.

In the accompanying drawing:

Fig. 1 is a top plan view of the collar adjusting device;

Fig. 2 is a side elevation thereof;

Fig. 3 is a view similar to Fig. 1, showing the arms angularly related and showing in dotted lines other various relative positions which the arms may assume;

Fig. 4 is a perspective view of one of the arms;

Fig. 5 is a sectional view on substantially line 5—5 of Fig. 2.

In the use of collar holding devices, it is frequently desirable that the flaps of the collar be maintained different desired distances apart; and the present manner of accomplishing such a result is to slide the flaps of the collar further in between the jaws which grip these flaps, which from many standpoints is undesirable; and in order to avoid this undesirable result, I have arranged the arms in a pivotal relation so that by positioning the arms at an angle to one another, their gripping points are closer together than when the arms are in line one with the other; and I afford a very nice adjustment of this angular relation by providing a spring which will yield to permit the desired adjustment to take place and yet will act to firmly hold the arms in the position to which they have been adjusted; and by the provision of serrations which will interfit one with the other, a step adjustment may be provided and yet one which is very effective in holding the parts in their desired relation; and the following is a more detailed description of the present embodiment of this invention illustrating the preferred means by which these advantageous results may be accomplished:

With reference to the drawing, 10 designates one arm and 11 the other arm, which are substantially identical and pivotally joined together. Each arm consists of a length of wire suitably bent into the desired formation, there being a shank portion 12 which is folded as at 14 back upon itself to provide an inwardly extending portion 13, and again bent, as at 15, to provide an outwardly extending portion 16 positioned parallel to and spaced from the portions 12 and 13. This jaw portion 16 terminates in a coil 17 which contacts with the jaw composed of the doubled portions 12 and 13. The end portion of the double wire at the fold 14 is bent away from the coil 17 to provide therewith the mouth 18 for easy entrance of the collar flap between these jaws to be resiliently gripped by the spring of the stock afforded at the fold 15.

The inner end of the shank 12 is coiled into an eye 20 having an opening 21 therethrough and one surface of this coil is serrated as at 22 providing teeth and recesses between them of a regular formation so that when these serrated portions 22 are placed face to face, as illustrated in Fig. 2, they will interfit one with the other. A pivot pin 24 extends through the opening 21 of these eyes 20 and is provided with a head at one side 25 while a spring 26 encircles the shank 27 of the rivet, the same being housed within a cap 28 which is held in position on the pin 24 by being enlarged or riveted over as at 29 to hold the parts in assembled relation. This spring acts between the cap 28 and the eye 20 tending to force these two eyes together and the serrated portions 22 in firm engagement, and yet the spring is of such a character as to easily yield as the arms are swung one with relation to the other, permitting them to slide from one notch to another and holding them firmly in such adjusted position.

The arrangement is such that the device may be slipped onto the opposite outer flaps of a shirt collar and then by adjusting the angularity, the flaps may be positioned the desired distance apart and there maintained by spring action of holding these arms in such adjusted position.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A collar adjusting device comprising a pair of arms, collar engaging means at the outer ends of said arms, and cooperating means on the inner ends of the arms for pivotally connecting the inner ends for relative adjustment, and an individual spring acting adjacent said pivotal connection for forcing the contacting portions of the arms toward each other into firm engagement.

2. A collar adjusting device comprising a pair of arms, collar engaging means at the outer ends of said arms, and cooperating means on the inner ends of the arms for pivotally connecting the inner ends for relative adjustment, and an individual coiled spring acting adjacent said pivotal connection for forcing the contacting portions of the arms toward each other into firm engagement.

3. A collar adjusting device comprising a pair of arms, collar engaging means at the outer ends of said arms, and cooperating means on the inner ends of the arms for pivotally connecting the inner ends for relative adjustment, and an individual spring acting adjacent said pivotal connection for forcing the contacting portions of the arms toward each other in firm engagement, said contacting portions being notched for various step positions of relative adjustment.

4. In a collar holder, a pair of wire arms each comprising a length of material provided at its inner end with an eye with one surface of the eye serrated and the outer end of each arm provided with a gripping jaw, said serrated eyes being presented face to face and pivoted together, and an individual spring acting at said pivotal connection to resiliently hold said faces in engagement.

5. In a collar holder, a pair of wire arms each comprising a length of material provided at its inner end with an eye with one surface of the eye serrated and with notches provided between the raised portions, and the outer end of each arm provided with a gripping jaw having the stock of the wire extending back and forth upon itself, said serrated eyes being presented face to face and pivoted together, and said jaws being disposed in opposite directions, and an individual spring acting at said pivotal connection to resiliently hold said faces in engagement but yielding to permit the projections of the serrations to move from one notch to another notch of the opposite eye.

6. In a collar holder, a pair of wire arms each comprising a length of material provided at its inner end with an eye with one surface of the eye serrated and the outer end of each arm provided with a gripping jaw, said serrated eyes being presented face to face and pivoted together by a pin extending through said eyes with heads formed at either end, a cap positioned on said pin engaging one head, and an individual spring engaging said cap and one of said eyes to force said serrated surfaces into engagement.

THOMAS GOSSELIN.